July 26, 1938.    C. CHRISTIANSEN    2,125,014
TRACTOR HITCH
Filed Nov. 4, 1937    2 Sheets-Sheet 1

Inventor
Christian Christiansen
By H. B. Willson &co
Attorneys

July 26, 1938.  C. CHRISTIANSEN  2,125,014
TRACTOR HITCH
Filed Nov. 4, 1937  2 Sheets-Sheet 2

Inventor
Christian Christiansen
By H. B. Willson & Co.
Attorneys

Patented July 26, 1938

2,125,014

UNITED STATES PATENT OFFICE 2,125,014

TRACTOR HITCH

Christian Christiansen, Fargo, N. Dak.

Application November 4, 1937, Serial No. 172,799

5 Claims. (Cl. 280—33.44)

The invention aims to provide a new and improved hitch for tractors, so constructed as to permit harrows, discs, seeders and the like to be hitched much closer to the tractor than with conventional hitches, the improved hitch being of a type to permit a plurality of implements to be hitched thereto in side-to-side or slightly overlapped relation, for simultaneously working a wide strip of earth.

A further object of the invention is to provide a hitch of simple and inexpensive construction which may be quickly and easily attached to and removed from a conventional tractor.

With the foregoing in view, the invention resides in the novel subject matter hereinafter described and claimed, description being accomplished by reference to the accompanying drawings.

Figure 1:
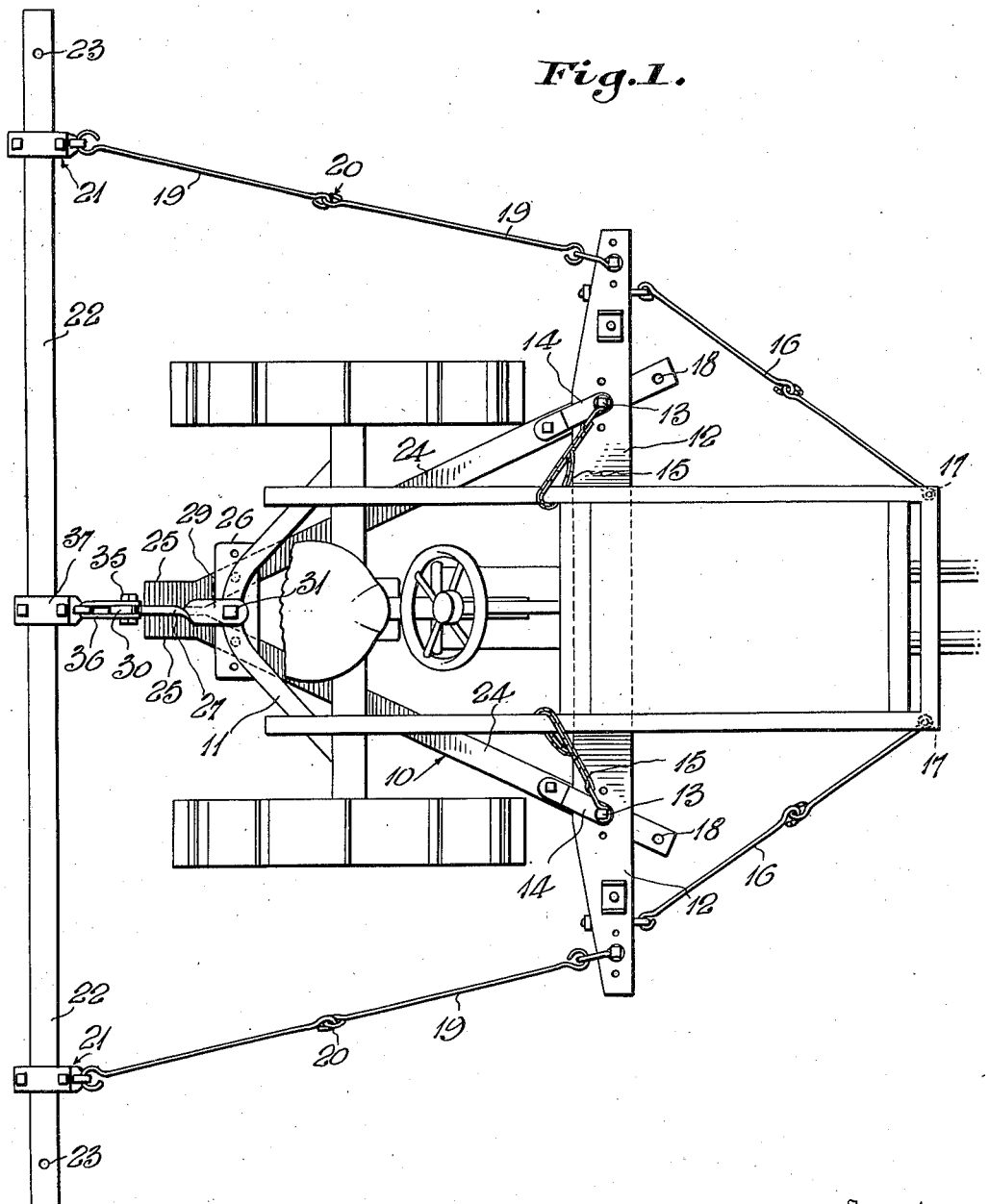
Figure 1 is a top plan showing the invention on a tractor.
Figure 2:
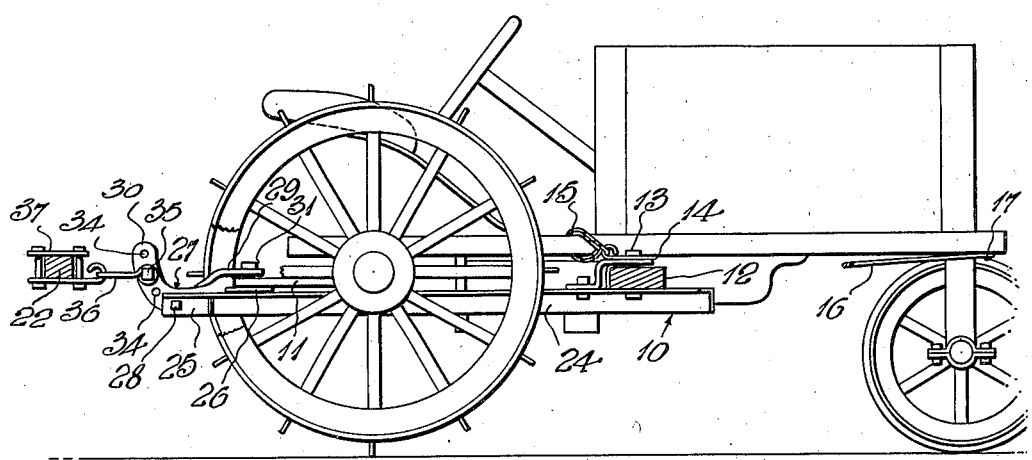
Fig. 2 is a side elevation partly broken away and in section.
Figure 3:
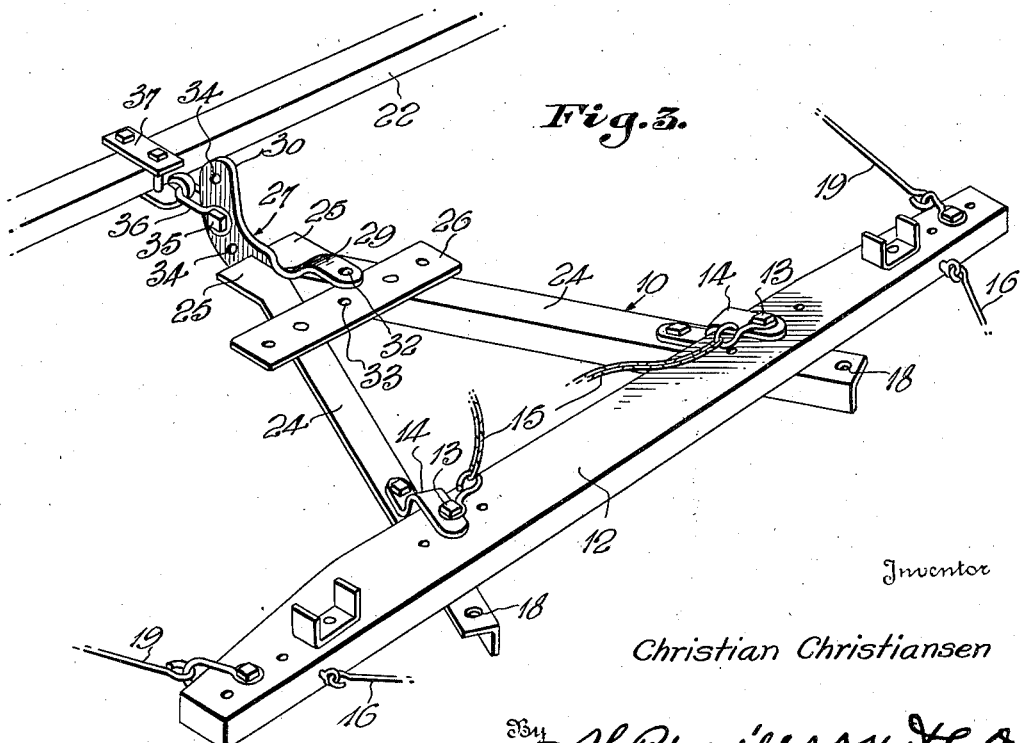
Fig. 3 is a perspective view of the hitch detached.

In the drawings above briefly described, a preferred construction has been shown and while this construction will be rather specifically explained, it is to be understood that variations may be made within the scope of the invention as claimed.

A V-frame 10 is provided to extend forwardly from the conventional tractor hitch 11, the rear relatively narrow end of said V-frame being provided with means for connecting it operatively with said hitch. A transverse bar 12 is secured by bolts or the like 13 and suitable brackets 14 to the relatively wide front end of the frame 10, said bar being intended to extend transversely under the tractor and to project laterally in opposite directions from the same. Chains or the like 15 are connected with the bar 12 or the frame 10 for engagement with the tractor frame to connect said bar 12 and frame 10 with said tractor frame, supporting them and preventing appreciable movement thereof with respect to the tractor. In addition to this connecting means, it is preferable to provide forwarding converging rods 16 connected with the ends of the bar 12 and bolted or the like at 17 to the front end of the tractor frame.

In some instances, it may be advisable to support the front end of the frame 10 and the bar 12 additionally by means of caster wheels, and for illustrative purposes, the front end of the frame is provided with openings 18 permitting the attachment of the casters if desired.

Draught members 19 are connected with the end portions of the bar 12 and extend rearwardly therefrom, said draught members preferably consisting of rods pivotally connected with each other as indicated at 20. The rear ends of these draught members are connected by suitable clamps 21 or other preferred means, with the end portitons of a hitch bar 22, said bar being intended to extend transversely behind the tractor and to project laterally in opposite directions therefrom. Any desired number of implements may be hitched to this bar in any appropriate way, and should it be advisable in some instances to support the ends of said bar by means of caster wheels, they may of course be provided. Openings 23 are shown in this bar to make the attachment of the casters possible.

In the present showing, the V-frame 10 is composed of two forwardly diverging angle metal bars 24 having parallel rear end portions 25, the two bars being rigidly connected by a transverse plate 26 to underlie the hitch 11. A bell crank 27 is fulcrumed between the bar ends 25 on a transverse bolt or the like 28, said bell crank having a forwardly projecting substantially horizontal arm 29 and a vertical arm 30. The arm 29 is intended to overlie the hitch 11 and a bolt 31 is provided for passage through this hitch, through an opening 32 in said arm 29, and through another opening 33 in the plate 26, thus effectively securing the rear end of the frame 10 to the hitch 11. The vertical arm 30 is formed with spaced openings 34 with any of which a clevis bolt 35 may be engaged for connecting a clevis or the like 36 with said arm, said clevis or the like being in turn connected with the central portion of the hitch bar 22 by means of a clamp 37 or other suitable device.

It will be seen from the foregoing that simple and inexpensive provision has been made, quickly and easily attachable to a tractor or detachable therefrom, for hitching a plurality of harrows, discs, seeders or other implements to a tractor in unusually close relation therewith for more advantageous operation. Obviously the hitch bar 22 may be of any appropriate length and if desired, a bar of one length may be quickly and easily substituted for one of another length. If a longer bar be applied and it be therefore advisable to move the two clamps 21 further outward away from each other, additional sections may be added to the draught rods 19 in order to reach said clamps.

Implements provided with tongues and intended to be drawn by horses, may be hitched closely to the hitch bar 22 by extending their tongues forwardly over this bar and over the bar 12, and I prefer to provide the end portions of said bar 12 with tongue sockets 38 in which the tongues may be held.

As excellent results may be obtained from the general construction shown and described, such construction is preferably followed. However, within the scope of the invention as claimed, variations may be made.

I claim:—

1. A tractor hitch comprising a push member having means for connecting its rear end with a conventional tractor hitch, a bar to extend transversely between the ends of and to project laterally in both directions from the tractor, said bar being connected with the front end of said push member to be pushed thereby, means for connecting said bar with the tractor, a hitch bar to extend transversely behind and to project laterally in opposite directions from the tractor, and draught means connecting the end portions of said draught bar with the end portions of the first mentioned bar.

2. A tractor hitch comprising a push member having means for connecting its rear end with a conventional tractor hitch, a bar to extend transversely between the ends of and to project laterally in both directions from the tractor, said bar being connected with the front end of said push member to be pushed thereby, means for connecting said bar with the tractor, a hitch bar to extend transversely behind and to project laterally in opposite directions from the tractor, draught means connecting the end portions of said hitch bar with the end portions of the first mentioned bar, and means connecting the central portion of said hitch bar with the rear end of said push member.

3. A tractor hitch comprising a V-frame having its narrow end disposed rearwardly and provided with means for connecting it with a conventional tractor hitch, a bar to extend transversely between the ends of and to project laterally in both directions from the tractor, said bar being secured to the relatively wide front end of said V-frame, means for connecting said bar with the tractor, a hitch bar to extend transversely behind and to project laterally in both directions from the tractor, and draught means connecting the end portions of said hitch bar with the end portions of the first mentioned bar.

4. A tractor hitch comprising a frame to extend forwardly from a conventional tractor hitch, the front end of said frame being provided with lateral portions to project in opposite directions from the tractor in front of the rear wheels, means for connecting the rear end of said frame with said hitch, means for connecting the front end of said frame with the tractor, a hitch bar to extend transversely behind and to project laterally beyond both sides of the tractor, and draught means connecting the end portions of said hitch bar with said lateral portions of said frame.

5. A tractor hitch comprising a hitch bar to extend transversely behind and project in opposite directions from a tractor, draught members connected with and extending forwardly from the end portions of said hitch bar, a frame connected with the front ends of said draught members and having a portion to underlie the conventional tractor hitch, a bell crank fulcrumed on the rear portion of said frame upon an axis extending transversely of the latter, said bell crank having a horizontal forwardly projecting arm and a vertical arm, said horizontal arm being intended to overlie the conventional tractor hitch, a vertical bolt passing through said horizontal arm and the underlying portion of the frame and intended for passage also through the conventional hitch, and means for connecting the central portion of said hitch bar with any of vertically spaced portions of said vertical arm.

CHRISTIAN CHRISTIANSEN.